J. Howland,
Scraper.
No. 98,969. Patented Jan. 18, 1870.

Witnesses:
Gustave Dieterich
Jno. F. Brook

Inventor:
J. Howland
per Munn & Co
Attorneys.

United States Patent Office.

JAMES HOWLAND, OF ROCK FALLS, ILLINOIS.

Letters Patent No. 98,969, dated January 18, 1870.

IMPROVED ROAD-SCRAPER.

The Schedule referred to in these Letters Patent and making part of the same

*To all whom it may concern:*

Be it known that I, JAMES HOWLAND, of Rock Falls, in the county of Whiteside, and State of Illinois, have invented a new and useful Improvement in Road-Scrapers; and I do hereby declare that the following is a full, clear, and exact description thereof, which will enable those skilled in the art to make and use the same, reference being had to the accompanying drawings, forming part of this specification.

This invention has for its object to provide a scraper, by which the earth may be gathered from both the sides of the road at once, and deposited on or about the centre, in a raised oval bed, and which may be readily guided and maintained on the line of the road-bed, or prevented from being thrown from side to side by unequal obstructions on either side.

Figure 1:
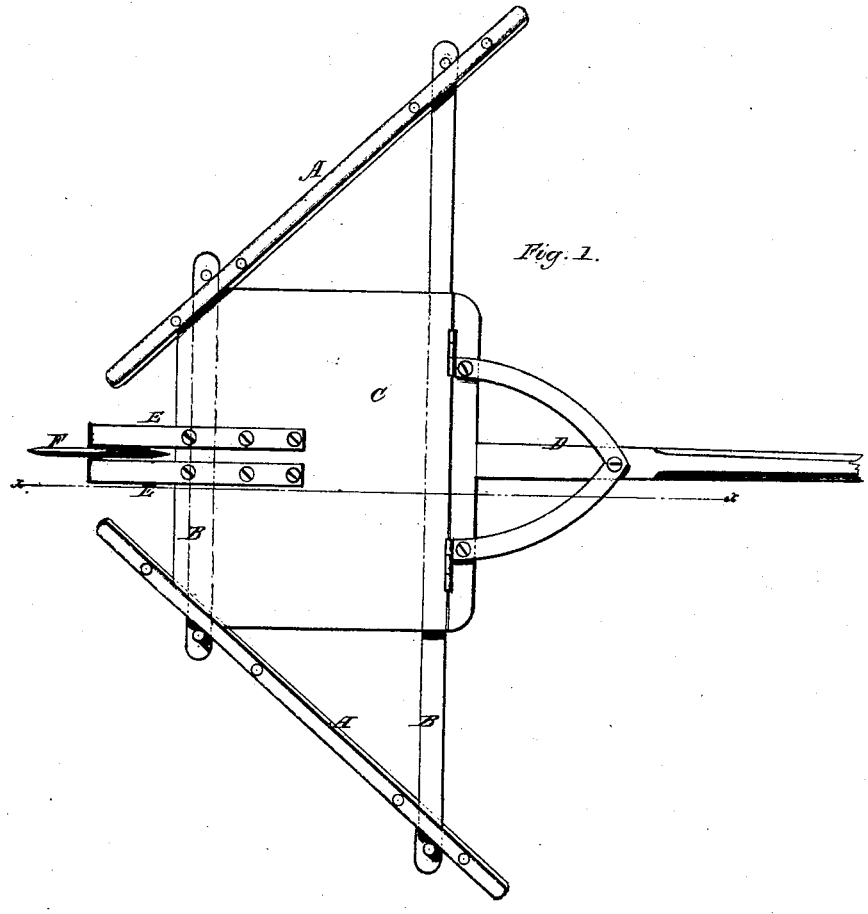
Figure 1 represents a plan view of my improved scraper.
Figure 2:
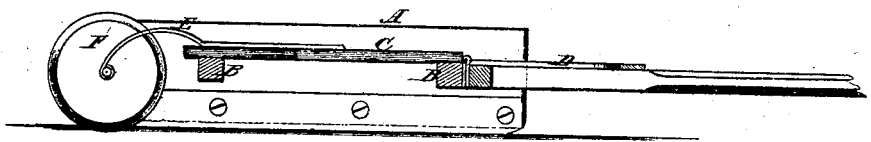
Figure 2 represents a section of the same, taken on the line $x\ x$ of fig. I.

I propose to employ two scraping-boards or plates, arranged, relatively to each other, as the two sides of a truncated triangle, the ends nearest together being separated about the distance required for the elevated part of the bed.

These two sides are suitably connected by transverse bars B, on which a platform, C, may be placed, if preferred.

At the front or widest end, the tongue D is connected, for drawing the device forward in that direction, to scrape up the earth at the sides, and move it toward the centre, operating on both sides at a time, the earth so gathered being delivered between the sides, at the narrow space at the rear.

To guide the said scraper, I arrange, at the centre of the rear, in bearing E, suitably projecting from the platform or from the sides A, a thin-edged disk or wheel, F, adapted for cutting into the ground, and resisting the lateral pressure of the unequal side-resistances which the sides constantly encounter, and which, in the absence of the said guiding-wheels, would defeat the proper action of the scraper.

This improved scraper is very useful in scraping down the ridges and filling the ruts of old roads, or in working up oval round beds in new ground.

Having thus described my invention,

What I claim as new, and desire to secure by Letters Patent, is—

The combination, with the sides A, arranged as described, of the guiding-wheel F, substantially as specified.

JAMES HOWLAND.

Witnesses:
   TRUMAN CULVER,
   ANDREW S. GOODELL.